United States Patent
Komukai

(10) Patent No.: US 9,400,158 B2
(45) Date of Patent: Jul. 26, 2016

(54) TACTICS SUPPORT APPARATUS AND TACTICS SUPPORT METHOD

(71) Applicant: MITSUBISHI HEAVY INDUSTRIES, LTD., Tokyo (JP)

(72) Inventor: Jun Komukai, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 14/670,594

(22) Filed: Mar. 27, 2015

(65) Prior Publication Data

US 2015/0276355 A1 Oct. 1, 2015

(30) Foreign Application Priority Data

Mar. 31, 2014 (JP) ................. 2014-074264

(51) Int. Cl.
*F41H 11/00* (2006.01)
*G06Q 10/06* (2012.01)

(52) U.S. Cl.
CPC ............... *F41H 11/00* (2013.01); *G06Q 10/06* (2013.01)

(58) Field of Classification Search
None
See application file for complete search history.

(56) References Cited

U.S. PATENT DOCUMENTS

| | | | | |
|---|---|---|---|---|
| 5,404,516 A * | 4/1995 | Georgiades | ............ | G06Q 10/06 718/104 |
| 6,497,169 B1 * | 12/2002 | Khosla | ............ | F41H 11/02 702/144 |
| 7,519,569 B1 * | 4/2009 | Flynn | ............ | G06N 5/043 706/45 |
| 7,757,595 B2 * | 7/2010 | Khosla | ............ | F41G 3/04 89/1.11 |
| 8,396,730 B2 * | 3/2013 | Khosla | ............ | G06Q 10/0631 705/7.11 |
| 8,468,112 B2 * | 6/2013 | de Kleer | ............ | G06N 5/04 706/46 |
| 2007/0168117 A1 * | 7/2007 | Howard | ............ | F41G 3/04 701/425 |
| 2011/0271822 A1 * | 11/2011 | Myr | ............ | G06Q 10/06 89/1.11 |

FOREIGN PATENT DOCUMENTS

JP    11-183091    7/1999

OTHER PUBLICATIONS

Lieutenant Colonel Timothy E. Gowen, "A Proposal to Rethink the Way We Develop National Military Strategy: More Science, Less Art", Mar. 18, 2005, U.S. Army War College.*
Artelli, Michael J. and Deckro, Richard F., "Modeling the Lanchester Laws with System Dynamics", The Journal of Defense Modeling and Simulation: Applications, Methodology, Technology, Jan. 2008, vol. 5 No. 1.*
Koji Iida, "Science of Battle: Theory of military OR", Sankeisya, Jun. 19, 2010 (with concise explanation of relevancy).

* cited by examiner

*Primary Examiner* — Troy Chambers
*Assistant Examiner* — Joshua Semick
(74) *Attorney, Agent, or Firm* — Wenderoth, Lind & Ponack, L.L.P.

(57) ABSTRACT

A tactics support apparatus includes an operation unit configured to calculate a friendly military power necessary for each of defense areas which are set between an enemy and a target of the enemy based on a total quantified military power of deployed movable weapons of the enemy and a friend, and determine friendly movable weapons to be deployed in each of the defense areas. An output unit is configured to visibly output deployment positions of the friendly movable weapons.

9 Claims, 12 Drawing Sheets

Fig. 11

| DEFENSE AREA | USED FIELD | DESIRED EFFECT | NECESSARY STRENGTH |
|---|---|---|---|
| 40-1 | 2 | REDUCED 30% | 500 |
| 40-2 | 1 | REDUCED 15% | 300 |
| 40-3 | 1 | REDUCED 15% | 200 |

Fig. 12

| DEFENSE AREA | NECESSARY STRENGTH | DEPLOYED WEAPONS | DEPLOYED STRENGTH |
|---|---|---|---|
| 40-1 | 500 | 70-1~70-5 | 550 |
| 40-2 | 300 | 70-6, 70-7 | 315 |
| 40-3 | 200 | 70-8 | 200 |

Fig. 13

| DEFENSE AREA | USED FIELD | ENEMY STRENGTH | DEPLOYED WEAPONS | DEPLOYED STRENGTH |
|---|---|---|---|---|
| 40-1 | 60-11 | 300 | 70-1~70-3 | 350 |
| | 60-12 | 200 | 70-4, 70-5 | 200 |

| ENEMY WEAPON | 20-11 | 20-12 | 20-13 | |
|---|---|---|---|---|
| ENEMY EVALUATION INDEX | 400 | 600 | 200 | |
| AMMUNITION NAME | AMMUNITION SCORE | | | | TARGET ENEMY WEAPON |
| E | -150 | 400 | 450 | 200 | 20-12 |
| G | -120 | 400 | 330 | 200 | 20-12 |
| A | -100 | 300 | 330 | 200 | 20-11 |
| D | -100 | 300 | 230 | 200 | 20-12 |
| B | -80 | 220 | 230 | 200 | 20-11 |
| F | -80 | 220 | 150 | 200 | 20-12 |
| C | -50 | 170 | 150 | 200 | 20-11 |
| H | -50 | 170 | 150 | 150 | 20-13 |

TACTICS SUPPORT APPARATUS AND TACTICS SUPPORT METHOD

CROSS-REFERENCE

This patent application claims a priority on convention based on Japanese Patent Application No. JP 2014-074264 filed on Mar. 31, 2014. The disclosure thereof is incorporated herein by reference.

TECHNICAL FIELD

The present invention relates to a tactics support apparatus and a tactics support method, and especially, to a tactics support apparatus and a tactics support method, in which friendly weapons are deployed.

BACKGROUND ART

In recent years, a system has been developed which can automatically determine that a threat which approaches the friendly military power in a relatively short time (e.g. a missile) should be intercepted by which interception means. For example, JP H11-183091A (Patent Literature 1) discloses a weapon scheduling apparatus which assigns to a target, a missile launcher that the number of times of discharging per a first bullet discharging waiting time is made the most.

An attack target of such an apparatus is a flying object such as a missile and an aircraft and approaches in a relatively short time. Therefore, the missile launcher which intercepts the target is fixedly deployed (developed) previously is a presupposition, and the apparatus does not need to approach the target. That is, in the system which allocates the apparatus which intercepts a flying object, the deployment of interception apparatuses could not be determined, and it is not necessary.

On the other hand, because a movable weapon exemplified by a ship takes some degree of time for a movement, the friendly movable weapon (e.g. ships) can be deployed previously for interception without waiting for the reaching of an enemy movable weapon to a target (our land and island). At this time, a troop operation person makes an operation procedure in which the deployment positions of the friendly movable weapons and a target of the firearms are set.

For example, when making the operation procedure of the troop, an enemy ship predicted route, a deployment position of the friendly ship which intercepts the enemy, and the deployment of the ammunition of the artilleries (e.g. firearms, rockets) and the guided weapons (missiles, guided missiles) are determined in consideration of the present deployment positions of the enemy ships and the friendly ships and each ability (attack, defense, role) and purpose. All of the operation procedures of such ships were made in hand of the person.

When all the operation procedures of the ships are made by persons, it took much time and the high level of performance of the person to make the operation procedure is required. However, the necessity to shorten time from the detection of the enemy ships to the deployment of the friendly ships increased with the appearance of a high-speed ship and the advance of guided weapons.

CITATION LIST

[Patent Literature 1] JP H11-183091A
[Non-Patent Literature 1] Koji Iida, "Science of Battle: the theory of military OR", Sankeisya, Jun. 19, 2010

SUMMARY OF THE INVENTION

An object of the present invention is to provide a tactics support apparatus and a tactics support method, which make an operation procedure of a movable weapon in a short time.

In an aspect of the present invention, a tactics support apparatus includes: an operation unit configured to calculate a friendly military power necessary for each of defense areas, which are set between an enemy and a target by the enemy, based on a total of a quantified value of an enemy military power containing enemy movable weapons and a quantified value of the friendly military power containing friendly movable weapons, and determine a part of the friendly movable weapons to be deployed in each of the defense areas; and an output unit configured to visibly output deployment positions of the parts of the friendly movable weapons.

In another aspect of the present invention, a tactics support method executed by a computer, the tactics support method includes:
calculating a friendly military power necessary for each of defense areas, which are set between an enemy and a target by the enemy, based on a total of a quantified value of an enemy military power containing enemy movable weapons and a quantified value of the friendly military power containing friendly movable weapons;
determining the friendly movable weapons to be deployed in each of the defense areas; and
visibly outputting deployment positions of the friendly movable weapons.

In still another aspect of the present invention, a non-transitory computer-readable storage medium, which stores a computer program, when executed by a computer, to realize the functions of:
calculating a friendly military power necessary for each of defense areas, which are set between an enemy and a target by the enemy, based on a total of a quantified value of an enemy military power containing enemy movable weapons and a quantified value of the friendly military power containing friendly movable weapons;
determining the friendly movable weapons to be deployed in each of the defense areas; and
allowing a output unit to visibly output deployment positions of the friendly movable weapons.

According to the present invention, a tactics support apparatus and a tactics support method, are provided, which make an operation procedure of a movable weapon in a short time.

BRIEF DESCRIPTION OF THE DRAWINGS

FIG. 11 is a diagram showing an example of necessary military power for every defense area which is calculated by the tactics support apparatus of the present invention.

FIG. 12 is a diagram showing an example of a deployment military power for every defense area which is calculated by the tactics support apparatus of the present invention.

FIG. 13 is a diagram showing an example of the deployment weapons, and the deployment weapon for every use field which is calculated by the tactics support apparatus of the present invention.

DESCRIPTION OF EMBODIMENTS

Figure 1:
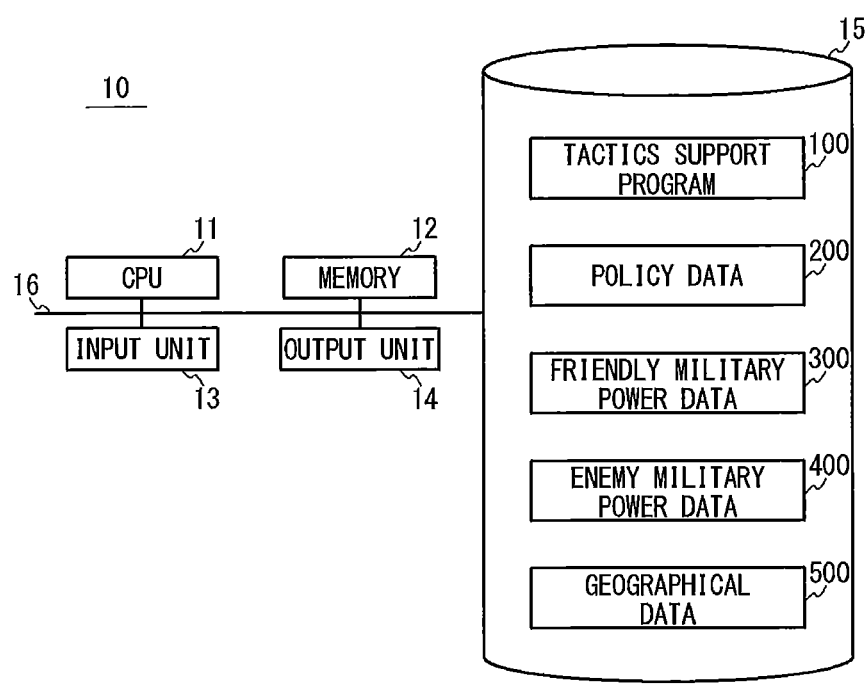
FIG. 1 is a diagram showing an example of a configuration of a tactics support apparatus of the present invention.

Hereinafter, embodiments of the present invention will be described with reference to the attached drawings. In the drawings, a same reference numeral is assigned to a same component. When the same or similar components are to be distinguished, additional reference numerals are added.

In the following embodiments, a tactics support apparatus will be described that automatically determines deployment positions of friendly military power such as ships, aircrafts, and strength to intercept enemy military power such as ships that invade friendly land and islands from sea. In the following description, a weapon such as a ship, a fighter, a submarine, and a surface-to-ship missile launcher that has at least one of a guided missile launcher and a rocket launcher and that can be moved autonomously or in accordance with an operator is referred to as a movable weapon. An enemy movable weapon is referred to as an enemy weapon, and a friendly movable weapon is referred to as a friendly weapon.

(Overview)

A tactics support apparatus 10 according to the present invention determines the deployment of the friendly military power to a plurality of defense areas based on friendly and enemy quantified military powers and a desired effect (e.g. an enemy reduction rate) set to each of the plurality of defense areas. The tactics support apparatus 10 determines use fields for the friendly weapons to be deployed, based on the deployed military power and current deployment positions of the friendly weapons (e.g. initial deployment positions). Then, the tactics support apparatus 10 determines a target of fires based on a threat level and a protection level of the enemy weapons and the deployment positions of the friendly weapons and the ability of fires such as guided missiles, and rockets (fire power deployment). The tactics support apparatus 10 according to the present invention uses the quantitative military power, and reduces a quantity of calculation for deployment of the friendly weapons by restricting fields where the friendly weapons can be deployed. Also, after the deployment of the friendly weapons, the distribution and deployment of ammunition loaded into the movable weapons are carried out in detail to make a practical troops operation possible.

(Configuration of Tactics Support Apparatus 10)

Referring to FIG. 1 to FIG. 6, the details of the configuration of the tactics support apparatus 10 of the present invention will be described.

FIG. 1 is a diagram showing an example of the configuration of the tactics support apparatus 10 of the present invention. Referring to FIG. 1, the tactics support apparatus 10 includes a CPU 11 (to be also referred to as an operation unit), a memory 12, an input unit 13, an output unit 14 and a storage unit 15, which are connected with each other through a bus 16. The input unit 13 outputs various data to the CPU 11 and the storage unit 15 through the operation of a keyboard, a mouse and so on by a user. The output unit 14 is exemplified by a monitor and a printer, and visibly outputs to the user, a troops operation result (for example, the deployment of friendly weapons and ammunition) that is outputted from the CPU 11. The storage unit 15 is an external storage unit which is exemplified by a hard disk, a memory and so on.

Figure 6:
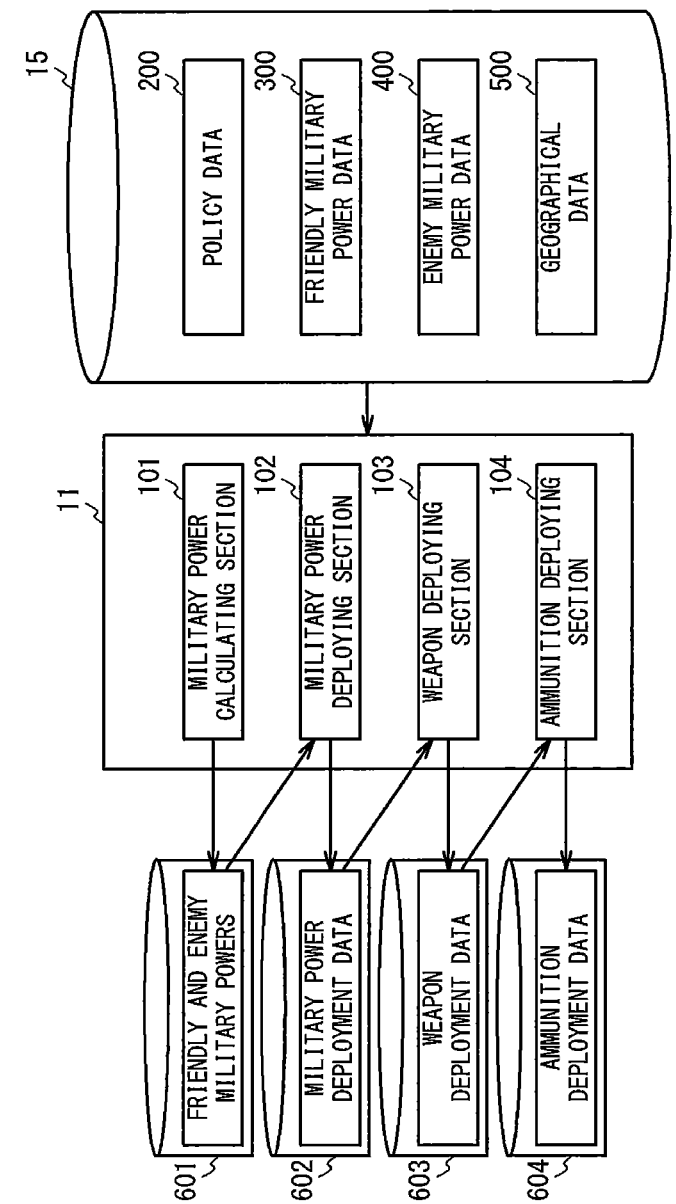
FIG. 6 is a functional block diagram showing an example of a function of the tactics support apparatus of the present invention.

The storage unit 15 stores a tactics support program 100, policy data 200, friendly military power data 300, enemy military power data 400 and geographical data 500. The CPU 11 executes the tactics support program 100 scored in the storage unit 15 to realize the functions of a military power calculating section 101, a military power deploying section 102, a weapon deploying section 103 and an ammunition deploying section 104, which are shown in FIG. 6. At this time, various data and the program are temporarily loaded into the memory 12 from the storage unit 15, and the CPU 11 executes various types of processing by using the data in the memory 12.

Figure 2:
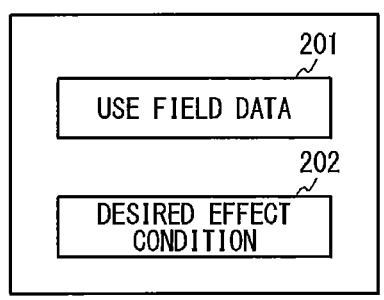
FIG. 2 is a diagram showing an example of policy data according to the present invention.

The policy data 200 contains data showing the course of action (COA) (to be referred to as a cooperation policy) which is a condition to deploy the friendly weapons 70. FIG. 2 is a diagram showing an example of the policy data 200 according to the present invention. Referring to FIG. 2, the policy data 200 contains use field data 201 and a desired effect condition 202. The use field data 201 contains data for specifying a field used as a battle field (hereinafter, to be also referred to as a use field 60). In detail, with reference to FIG. 8 and FIG. 9, the use field data 201 includes data for specifying defense lines 31 (31-1, 31-2, 31-3, 31-4), defense areas 40 (40-1, 40-2, and 40-3), a usable field 50 and the use fields 60 (60-31, 60-12, 60-21, and 60-11). Each of the defense lines 31 is set between enemy weapons 20 and the attack target by the enemy (land and islands 30 (30-1 and 30-2) in this example). Each of the defense areas 40 is set between the neighboring defense lines 31. The details of the defense lines 31, the defense areas 40, the usable field 50, and the use fields 60 will be described below. The desired effect condition 202 contains a condition for calculating a desired effect (a decrease quantity) in the defense areas 40. For example, a calculation equation for calculating the desired effect by using the use field 60 as a variable (e.g. the third law of the Lanchester model) and a calculation condition (e.g. a retreat condition) to be used in case of calculation of the desired effect are registered as the desired effect condition 202. Or, the desired effect itself may be registered as the desired effect condition 202. Note that the desired effect indicates an attrition condition of the enemy military power which is subtracted through the attack by the friendly weapons 70 (a personnel attrition rate or the number of attrition persons).

Figure 3:
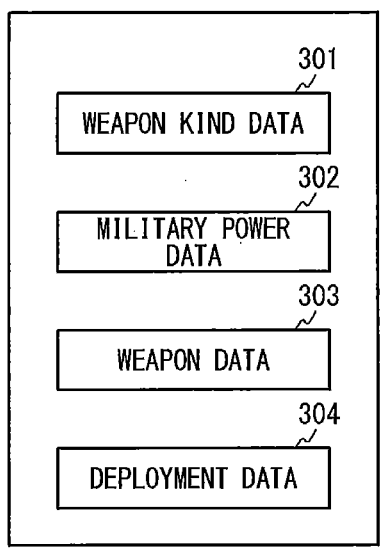
FIG. 3 is a diagram showing an example of friendly military power data according to the present invention.

The friendly military power data 300 contains data for specifying the quantitatively set military power to each of the friendly weapons 70 and equipment (arms) loaded in the friendly weapon 70. FIG. 3 is a diagram showing an example of the friendly military power data 300 according to the present invention. Referring to FIG. 3, the friendly military power data 300 includes weapon kind data 301, military power data 302, weapon data 303, and deployment data 304. The weapon kind data 301 contains a name or an identifier for specifying a kind of each of the friendly weapons and the individual weapon itself. For example, it is desirable that the weapon kind data 301 contains a ship name, a submarine name, a fighter name, and an identification of each of them.

The military power data 302 shows the weapon kinds specified by the weapon kind data 301 and the military power corresponding to arms loaded in the weapon specified by the weapon data 303. The military power is previously determined according to the weapon kind and arms loaded in the weapon, and it is desirably that the military power is shown by a quantified numerical value. Also, it is desirable that a value of the military power under the consideration of offensive power and defensive power determined according to a kind of the weapons and the offensive power determined according to the loaded arms is previously set in an evaluation collection (a database: not shown).

The weapon data 303 contains data for specifying arms loaded in each of the friendly weapons 70 specified by the weapon kind data 301. For example, when the friendly weapon 70 is a ship, a kind of arms such as a rapid fire gun, an anti-ship guided missile launcher, a torpedo launcher, an anti-air missile, and a very short range air defense system, and the number of arms of the kind are recorded as the weapon data 303. Or, when the friendly weapon 70 is a fighter, a kind of arms such as the anti-air missiles, and the number of arms of the kind are recorded as the weapon data 303.

Here, an example of a method of prescribing the quantification of the military power will be described. For example, a calculation result data is normalized by using a performance value determined based on a firing range, flight speed and so on for each of the arms such as a guided missile and a rocket loaded in the fighter or ship, and an integral value of the normalized data over the loaded arms is calculated as a part of the military power.

Specifically, the military power B_weapon[0][X1] of an SSM (Surface-to-Ship Missile) is calculated from the following equation (1). The military power B_weapon[2][X3] of the fighter is calculated from the following equation (2). The military power B_weapon[1][X2] of a combat ship is calculated from the following equation (3). In this case, it is supposed that the ASM (Air-to-Ship Missile) is loaded on the fighter, and the SSM (Ship-to-ship Missile) and the SAM (Ship-to-Air Missile) are loaded on the combat ship.

$$B\_weapon[0][X1] = \frac{\sum_{SSM\ kind}(number \times range \times flight\ speed)}{SSM\ average\ range \times SSM\ average\ flight\ speed} \quad (1)$$

$$B\_weapon[2][X3] = \frac{\sum_{SSM\ kind}(number \times range \times flight\ speed)}{ASM\ average\ range \times ASM\ average\ flight\ speed} \quad (2)$$

$$B\_weapon[1][X2] = \quad (3)$$
$$\frac{\sum_{SSM\ kind}(number \times range \times flight\ speed)}{SSM\ average\ range \times SSM\ average\ flight\ speed} +$$
$$\frac{\sum_{ASM\ kind}(number \times range \times flight\ speed)}{ASM\ average\ range \times ASM\ average\ flight\ speed}$$

Referring to the equation (1), a product of the firing range and flight speed of each of the missiles is calculated for every kind of the SSM, and a summation of the products over the number of SSM missiles is normalized by dividing the summation by a product of an average firing range and an average flight speed with respect to all the SSM missiles which are currently used or known. Thus, the normalized data is determined as a part of the military power for the SSM.

In the same way, referring to the equation (2), a product of the firing range and the flight speed is calculated for every kind of ASM loaded in the fighter, and a summation of the products over the number of ASM missiles is normalized by dividing the summation by a product of an average firing range and an average flight speed with respect to all the ASM missiles which are currently used or known. Thus, the normalized data is determined as a part of the military power for the fighter.

Moreover, referring to the equation (3), a product of the firing range and the flight speed is calculated for every kind of SSM, and a summation of the products over the number of SSM missiles loaded in the combat ship is normalized by dividing the summation by a product of an average firing range and an average flight speed of all the SSM missiles which are known or used at present. Thus, the normalized data is determined as a part of the military power for the SSM. Also, a product of the firing range and the flight speed is calculated every kind of SAM loaded in the combat ship, and a summation of the products is normalized by dividing the summation by a product of an average firing range and an average flight speed over all the SAM missiles which are known or used at present. Thus, the normalized data is determined as a part of the military power for the SAM. A summation of the part of the military power for the SSM and the part of the military power of the SAM is determined as a part of the military power for the combat ship.

It is desirable that the average firing range and the average flight speed for each of SSM, ASM, and SAM used for the normalization or presumption values of them are previously registered on a database (not shown). By normalizing parameters of each of the loaded firearms by the average firing range and the average flight speed of the arm which is generally known or used, the normalized military power for the firearm can be determined and utilized for the power deployment and the weapon deployment. Note that a method of quantifying and normalizing the military power is not limited to the above method, and the method may be changed appropriately.

The deployment data 304 contains data for specifying the deployment positions of the friendly weapons 70. The deployment data 304 may be written in any format if being data showing the deployment positions of the friendly weapons 70. For example, data showing a position on a map, data for specifying the use field 60, and data showing a friendly weapon group 90 (e.g. a fleet) to which itself belongs may be used as the deployment data 304.

Figure 4:
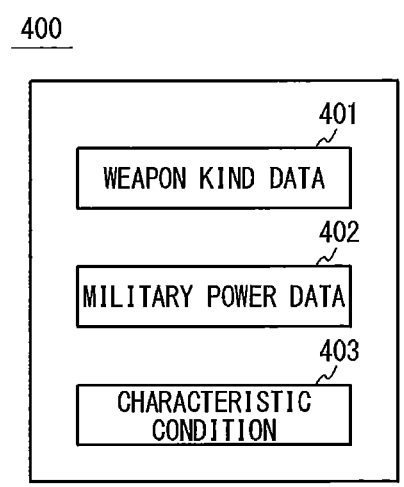
FIG. 4 is a diagram showing an example of enemy military power data according to the present invention.

The enemy military power data 400 contains data for specifying the military power quantitatively set to the enemy weapons 20. FIG. 4 is a diagram showing an example of the enemy military power data 400 according to the present invention. Referring to FIG. 4, the enemy military power data 400 has weapon kind data 401, military power data 402 and a characteristic condition 403. The weapon kind data 401 contains a name or an identifier for specifying a kind of each of the enemy weapons 20 or an identifier for specifying each of the enemy weapons 20. For example, it is desirable that the weapon kind data 401 contains a ship name, a submarine name, a fighter name or an identifier of each of them.

The military power data 402 shows military power corresponding to a weapon kind of the weapons specified by the weapon kind data 401. The military power is previously determined according to a kind of the weapons and loaded arms, and it is desirable that the military power is shown by a quantified numerical value. It is desirable that a value of the military power which is determined in consideration of an offensive power and a defensive power determined according to the kind of the enemy weapons and an offensive power determined according to the loaded arms, is previously set to an evaluation collection (database (not shown)). It is desirable that regarding the arms loaded in the enemy weapon 20, arms set previously according to the weapon kinds are loaded is regarded as the loaded arms, and it is desirable that the military power corresponding to the arms set previously according to the weapon kinds is set.

The characteristic condition 403 shows conditions to determine the characteristics of the enemy weapons 20. For example, a condition for specifying an initial deployment position of the enemy weapons 20, a condition for specifying a direction 21 of the invasion (predicted approaching route), and a condition for specifying the enemy weapon group 80 to which the enemy weapons 20 belong (e.g. a fleet) are recorded as the characteristic condition 403.

Figure 5:
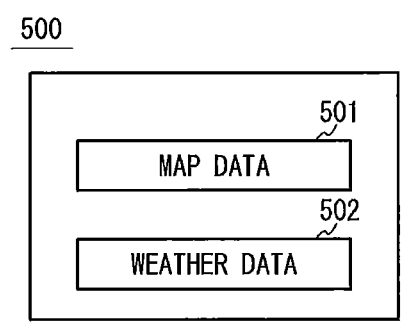
FIG. 5 is a diagram showing an example of geographical data in the present invention.

FIG. 5 is a diagram showing an example of the geographical data 500 according to the present invention. Referring to FIG. 5, the geographical data 500 contains map data 501 and weather data 502. The map data 501 contains data showing a geographical situation which influences the movement of the weapons and the use of the arms, such as a topographical map, a chart, an air route map, and water depth data, and data showing the positions of obstacles such as sea mines. The weather data 502 contains data showing a weather situation which influences on the movement of the weapons and the use of the arms, such as weather, wind direction, wind force, wave height, ambient temperature, and ebb and flow.

Each of the policy data 200, the friendly military power data 300, the enemy military power data 400, and the geographical data 500 may be set from the input unit 13 by the user, and may be set by another unit (not shown). Also, the policy data 200, the friendly military power data 300, the enemy military power data 400, the geographical data 500 may be dynamically changed. For example, the data of the enemy weapons 20 may be automatically registered or changed as the enemy military power data 400 based on data detected by a radar unit and so on. Or, data obtained from another unit may be registered or changed as the weather data 502 and the friendly military power data 300.

FIG. 6 is a functional block diagram showing an example of functions of the tactics support apparatus 10 of the present invention. Referring to FIG. 6, each function of the military power calculating section 101, the military power distributing section 102, the weapon deploying section 103, and the ammunition deploying section 104 according to the present invention will be described.

The military power calculating section 101 calculates a total of friendly and enemy military powers as friendly and enemy military powers 601 based on the friendly military power data 300 and the enemy military power data 400. In detail, the military power calculating section 101 specifies currently usable friendly weapons 70 based on the deployment data 304, and calculates a total military power of the friendly weapons 70 based on the military power data 302. Also, the military power calculating section 101 specifies the enemy weapons 20 registered as the enemy military power data 400 and calculates a total military power of the enemy weapons 20 based on the military power data 402.

The military power deploying section 102 determines the deployment of the friendly military power based on the policy data 200 and the friend and enemy military powers 601, and outputs the deployment result as the military power deployment data 602. In detail, the military power deploying section 102 specifies a range of the defense areas 40 based on the use field data 201, and calculates (determines) the desired effect for every defense area 40 based on the desired effect condition 202. Next, the military power distributing section 102 distributes a part of the friendly military power necessary for every defense area 40 based on the desired effect and the friendly and enemy military powers 601, and outputs the distribution result (the defense area necessary military power) as the military power deployment data 602.

The weapon deploying section 103 determines the deployment positions of the friendly weapons 70 based on the policy data 200, the friendly military power data 300, the enemy military power data 400, and the geographical data 500, and outputs it as the weapon deployment data 603. In detail, the weapon deploying section 103 grasps the current positions of the friendly weapons 70 (e.g. initial deployment positions) based on the deployment data 304 and the characteristic condition 403, and grasps the positions of the enemy weapons 20, and an invasion direction 21 (predicted approaching route). Also, the weapon deploying section 103 determines the friendly weapons 70 to be deployed for every defense area 40 based on the military power deployment data 602 and the military power data 302 and 402. Also, the weapon deploying section 103 determines the friendly weapons 70 to be deployed for every use field 60 based on the use field data 201 and the positions of the enemy weapons, and the invasion direction. For example, the weapon deploying section 103 calculates the power of an enemy weapon group 80, estimates the friendly military power to be deployed in the use field 60 in the neighborhood of the enemy weapon group 80, and distributes the friendly weapons 70 more than the power corresponding to the estimation result in the use field 60. Note that the distribution of the friendly weapons 70 for every defense area 40 and the distribution of the friendly weapons 70 for every use field 60 are desirably determined in consideration of the geographical data 500 and the movement ability of the friendly weapons 70 (e.g., cruising and flight ranges).

The ammunition deploying section 104 determines the enemy weapons 20 as an attack target of the ammunition and firearms loaded in the friendly weapons 70 based on the friendly military power data 300, the enemy military power data 400, the geographical data 500 and the weapon deployment data 603. In detail, the ammunition deploying section 104 specifies an offensive power and firing range of ammunition and the firearms of the friendly weapons 70 based on the weapon data 303 and specifies a priority level of the target allocation, and grasps a distance between the enemy weapons 20 and the friendly weapons 70 based on the deployment data 304 and the characteristic condition 403 and grasps the geography and weather based on the geographical data 500, and determines the enemy weapons 20 as the target of the firearms and the ammunition. A combination of the ammunition and the enemy weapons 20 as the target is outputted as the ammunition deployment data 604.

As mentioned above, the tactics support apparatus 10 of the present invention can automatically output the deployment positions of the friendly weapons 70 (e.g. the ships and the fighters) and the target allocation of the ammunition by grasping a current situation (positions, the numbers, and the kinds) of the enemy weapons 20 and the friendly weapons 70 and specifying the use field 60 as the policy data 200.

(Tactics Support Method)

the details of the operation of the tactics support apparatus 10 of the present invention will be described with reference to FIG. 7 to FIG. 16 by using a case where the enemy weapons 20 invade the land and islands 30-1 and 30-2 from the sea, the friendly weapons 70 is deployed to the enemy weapons 20, and the target of the firearms loaded in the friendly weapons 70 is allocated, as an example.

Figure 7:
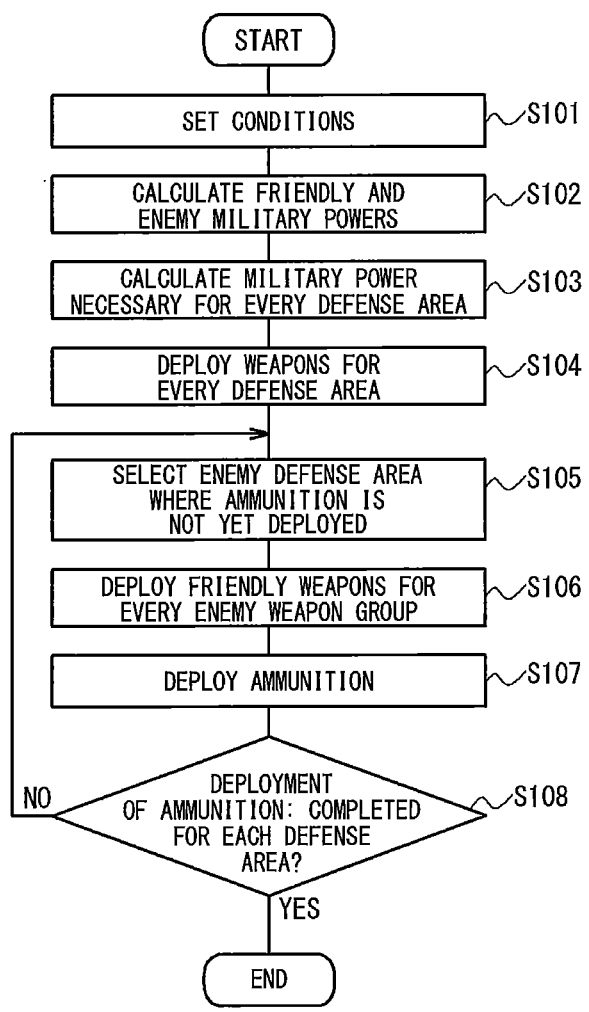
FIG. 7 is a flow chart showing an example of a tactics support method of the present invention.

FIG. 7 is a flow chart showing an example of the tactics support method of the present invention. Referring to FIG. 7, a user sets to the tactics support apparatus 10, conditions for carrying out the deployment of the friendly weapons 70 and the deployment of ammunition (Step S101). In this case, the policy data 200, the friendly military power data 300, the enemy military power data 400, the geographical data 500 are set. Specifically, the enemy weapons 20 shown in FIG. 8 (the weapon kinds and the deployment positions), the invasion directions 21-1 and 21-2 of the enemy weapons 20 (to be referred to as a predicted approaching route), the land and islands 30-1 and 30-2 (landforms and positions), the defense lines 31-1 to 31-4, the defense areas 40-1 to 40-3, the usable field 50 shown in FIG. 9, the use fields 60, and the friendly weapons 70 (the weapon kinds and the deployment positions) are set. Also, data of the landform and the weather are set. The deployment positions of the enemy weapons 20 detected by a radar and so on may be automatically set or may be set by the user. The invasion direction 21, the defense lines 31, the defense areas 40, the usable field 50, and the use fields 60 are optionally set by the user.

Figure 8:
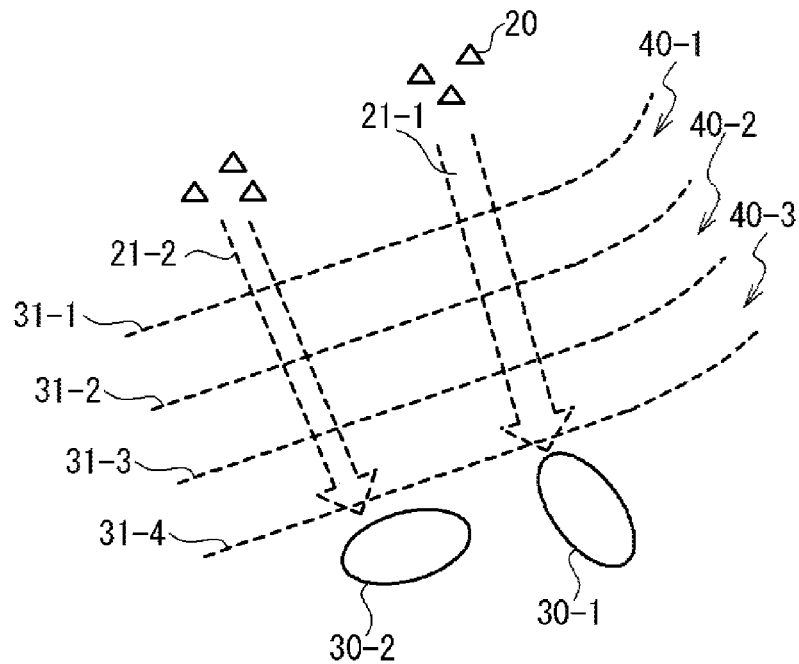
FIG. 8 is a conceptual diagram showing an example of a parameter which is set to the tactics support apparatus of the present invention.
Figure 9:
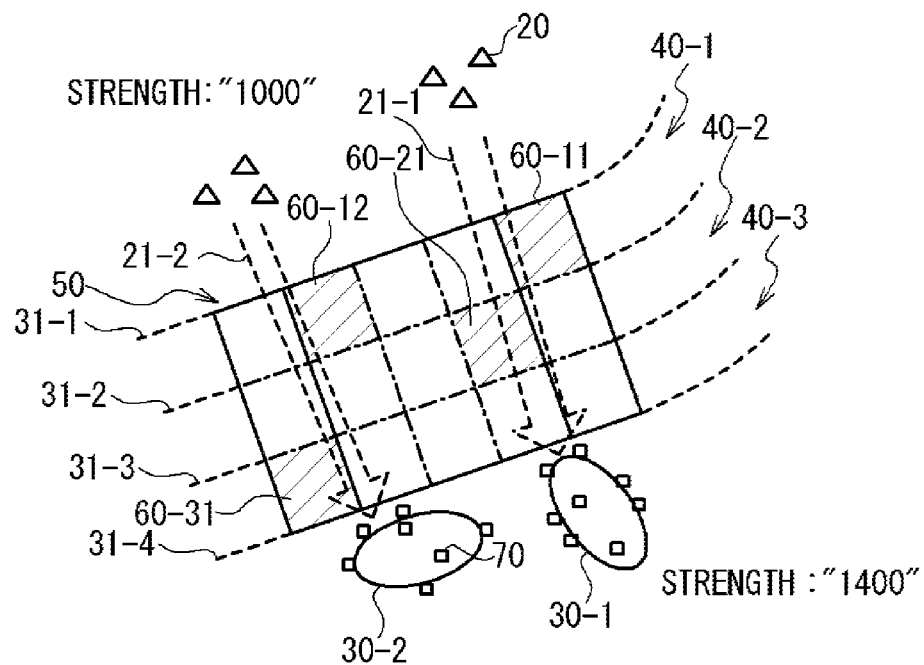
FIG. 9 is a conceptual diagram showing another example of the parameter which is set to the tactics support apparatus of the present invention.

For example, referring to FIG. 8, when the enemy weapons 20 have been deployed, the invasion directions 21-1 and 21-2 (the predicted approaching routes) are optionally set by the user between the enemy weapons 20 and the land and islands 30-1 and 30-2 as the targets of the enemy weapons 20 (20-1, 20-2). Also, the defense lines 31-1 to 31-4 are set by the user in a predetermined constant interval from the enemy side in the field (e.g. a field of sea) between the enemy weapons 20 and the land and island 30. The area between neighboring defense lines 31 is set as one of the defense areas 40-1 to 40-3. At this time, the usable field 50 having a plurality of fields as shown in FIG. 9 is set. For example, the usable field 50 is divided at the size determined according to the interval between neighboring defense lines 31 into a plurality of fields, and shows a battle possible field between the friendly weapons 70 and the enemy weapons 20. For example, it is desirable that the usable field 50 has a plurality of rectangular fields, each of which is a rectangular field having a horizontal length and a vertical length, which are the same as the interval between the defense lines 31. The number of defense areas 40 in the invasion direction is determined based on the number of defense lines 31. That is, it is desirable that the width of the usable field 50 in the invasion direction 21 is determined according to the width from the defense line 31-1 to the defense line 31-4. It is desirable that the width of the usable field 50 in the direction orthogonal to the invasion direction 21 is set according to the scale of deployed enemy weapons 20 (e.g. a total number of ships in the fleet) or the deployment width of the enemy weapons 20 (a width in the direction orthogonal to the invasion direction). Especially, it is desirable that the usable field 50 is set to include all the deployed enemy weapons 20 in the invasion directions 21 (the invasion directions 21-1 and 21-2 of in this case). Note that the usable field 50 may be automatically set or may be optionally set by the user.

Also, the use fields 60 in which the friendly weapons 70 are deployed are set in the usable field 50. It is desirable that the fields having a high possibility that the friendly weapons 70 and the enemy weapons 20 battle with each other are set as the use fields 60. Therefore, it is desirable that the use fields 60 are selected from the fields where the invasion directions 21 (the invasion route) and the usable field 50 intersect. Generally, the use fields 60 are set by the user but may be automatically set according to a predetermined algorithm. Also, although being not shown, the fields which cannot be set as the use fields 60 from the usable field 50 may be set based on the geographical data 500. For example, the fields which are not appropriate for the battle because the wave is high or the wind is strong, cannot be set as the use field 60.

It is desirable that the data set in case of condition setting at the step S101 is visibly outputted as shown in FIG. 8 or FIG. 9. Also, at the step S101, various conditions do not have to be set simultaneously and may be set and changed each time of necessity or regularly. For example, during the processing of steps S102 to S108 to be mentioned later, the conditions may be dynamically changed.

When the weapon kinds of the friendly weapons 70 and enemy weapons 20, loaded arms, and the number of arms are set, the military power calculating section 101 calculates the friendly and enemy military powers (Step S102). Here, the quantitative powers are calculated from the weapon kinds of the deployed enemy weapons 20 and the available friendly weapons 70, the numbers of weapons, the loaded arms, and so on. For the calculation of the military powers, the quantitative military powers set previously according to the weapon kinds and the loaded arms are used. The previously set military power is desirably registered in a database and used. FIG. 9 is a conceptual diagram showing an example of parameters set in the tactics support apparatus 10 of the present invention. Referring to FIG. 9, a total enemy military power (e.g. strength) is calculated as "1000", and a total friendly military power (e.g. strength) is calculated as "1400".

When the friendly and enemy military powers are calculated and the defense areas 40 and the use fields 60 are set, the military power deploying section 102 calculates the military power necessary for the friend for every defense area 40 (Step S103). In detail, the military power deploying section 102 calculates a desired effect for every defense area 40 by using the Lanchester model (e.g. the third law). For example, when "setting a desired effect in proportional to the area of the use field 60" is set as the desired effect condition 202, the military power deploying section 102 sets the desired effect based on the area of the use field 60 set for every defense area 40.

FIG. 11 is a diagram showing an example of a military power necessary for every defense area calculated by the tactics support apparatus 10 of the present invention. Referring to FIG. 9 and FIG. 11, a total area of the use fields 60-11 and 60-12 set for the defense area 40-1 is "2", a total area of the use field 60-21 set for the defense area 40-2 is "1", and a total area of the use field 60-31 set for the defense area 40-3 is "1". In this case, the desired effect is set in the rate of 2:1:1 to the defense areas 40-1, 40-2, and 40-3. For example, the desired effect is set for an attrition rate of the enemy military power to be 30% in the defense area 40-1, to be 15% in the defense area 40-2, and to be 15% in the defense area 40-3 as an example. Here, for the desired effect, a fixed margin may be given and a weight may be set to the defense area 40. For example, a heavy weight is set to the defense area 40-1 as a front line and the defense area 40-3 as a final defense line. When the setting conditions of the use field 60 are the same as the above, the desired effect is set in the rate of 2.5:1:1.5 to the defense areas 40-1, 40-2, and 40-3.

Next, the military power deploying section 102 calculates the military power necessary for every defense area 40 based on the desired effect from the total military powers of the friend and enemy by using the Lanchester model (the third law). For example, as a method of calculating the necessary military power by using Lanchester model, a method described in the Science of Battle-Theory of military OR (Sankeisya, K. Iida) (Non-Patent Literature 1).

Figure 10:
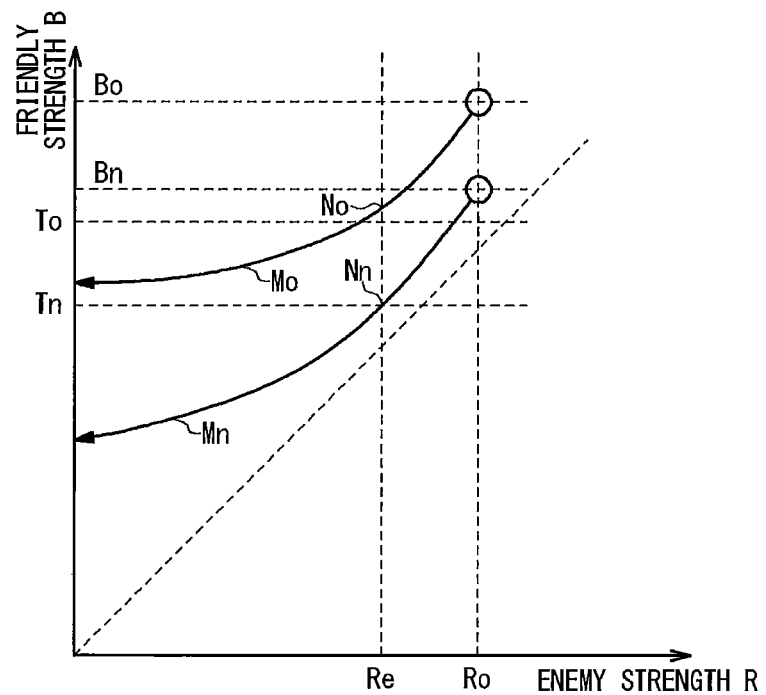
FIG. 10 is a diagram showing an example of a method of calculating necessary power for every defense area by the tactics support apparatus of the present invention.

Referring to FIG. 10, an example of the method of calculating the necessary military power for every defense area 40 by using Lanchester model (the third law) will be described. It is supposed that an initial value (whole usable power) of the friendly military power B is set to "Bo", and an initial value of the enemy military power (enemy power R) is set to "Ro". The enemy power R after attrition which is desired in the defense areas 40 is calculated according to the desired effect in the defense area 40 (e.g. the attrition rate). In this case, the enemy military power R after the attrition is calculated as "Re". On the other hand, a threshold value To for retreat is calculated from a retreat condition based on the friendly military power "Bo", and a model curve Mo is calculated based on the Lanchester model. At this time, a point "No" on the model curve Mo when the enemy military power R is "Re" shows the friendly remaining power when the enemy power after the attrition is "Re". When the remaining power "No" is greater than the threshold value To, the friendly power B is decreased until a point "N" on the model curve M when the enemy power R is "Re" coincides with the threshold value T. In this case, on a model curve Mn by the Lanchester model when the friendly power B is "Bn", the remaining power "Nn" when the enemy power, R is "Re" becomes equal to the threshold value Tn when the friendly power B is "Bn". At this time, the friendly power "Bn" is calculated as the friendly military power necessary in the defense area 40. Note that when the friendly remaining power "No" which is based on the initial value "Bo" of the friendly power B falls below the threshold value To, the retreat condition and the desired effect are changed and the calculation is desirably carried out again. In an example shown in FIG. 11, the power (e.g. strength) necessary for the defense area 40-1 is calculated to be "500", the power (e.g. strength) necessary for the defense area 40-2 is calculated to be "300" and the power (e.g. strength) necessary in the defense area 40-3 is calculated to be "200".

Next, the weapon deploying section 103 determines a distribution of the friendly weapons 70 for every defense area 40 (Step S104). In detail, the weapon deploying section 103 determines the friendly weapons 70 to be deployed in the defense area 40 based on the military power necessary for every defense area 40, the deployment position of the current friendly weapons 70 (e.g. the initial deployment positions), flight range, and firing range (e.g. the maximum firing range).

For example, referring to FIG. 12, the weapon deploying section 103 determines the friendly weapons 70 to be deployed in the defense area 40 such that the total military power of the friendly weapons 70 allocated to the defense area 40 is above the power necessary for the defense area 40. For example, the friendly weapons 70-1 to 70-5 (a total power (e.g. strength) of "550") are allocated to the defense area 40-1 where the necessary military power (e.g. strength) is set to "500". Also, the friendly weapons 70-6 and 70-7 (a total power (e.g. strength) of "315") are allocated to the defense area 40-2 where the necessary power (e.g. strength) is set to "300". Also, the friendly weapons 70-8 (a total power (e.g. strength) of "200") is allocated to the defense area 40-3 where the necessary power (e.g. strength) is set to "200".

It is desirable that the friendly weapons 70 deployed in the defense area 40 are determined according to a predetermined algorithm in consideration of a distance from the current position to the defense area 40 or the use field 60 set there, the flight range of the friendly weapon, or the firing range of the friendly weapons 70 (e.g. a maximum firing range). It is desirable that the distance from the current position to the defense area 40 or the use field 60 set there is determined in consideration of a geographical condition and a weather condition. For example, the friendly weapon 70 that the above distance when avoiding the landform impossible to move is the shortest is allocated to the defense area 40 or the use field 60. Also, it is desirable to set the width of each of the plurality of fields (for example, the width of the use field 60) in the defense area 40 to be equal to the firing range of the ammunition. In this case, it is desirable that the friendly weapon with the firing range of the ammunition which is longer than the width of the use field 60 is allocated to the defense area 40 to which the use field 60 belongs.

Next, the tactics support apparatus 10 carries out the allocation to an enemy weapon group 80 as the target of the friendly weapons 70 and the deployment of the ammunition, to the defense area 40 nearest to the enemy, of the defense areas 40 to which the deployment of the ammunition is not completed (Step S105 to S108).

In detail, first, the weapon deploying section 103 selects the defense area 40, nearest to the enemy, of the defense areas 40 to which the deployment of the ammunition is not completed, as an object area of the weapon deployment (Step S105). In an example shown in FIG. 14, the defense area 40-1 in the front line is selected as a deployment object area. Next, the weapon deploying section 103 deploys the friendly weapons 70 to the use field 60 in the selected defense area 40 (Step S106). In this case, the friendly weapon group 90 which engages in battle with the enemy weapon group 80 (80-1, 80-2, e.g. fleet) is allocated. In detail, the weapon deploying section 103 determines a distribution of the friendly military power to the use field 60 in the defense area 40 based on the invasion direction 21, the enemy military power according to the enemy weapon group 80, and the position of the enemy military power, and determines the friendly weapon group 90 corresponding to the friendly military power. In this example, because the use field 60 is set according to the invasion direction 21 of the enemy weapons 20, the enemy weapon group 80 (as the target) which engages in battle with the friendly weapon group 90 is determined by determining the friendly weapon group 90 deployed in the use field 60. Also, when a plurality of friendly weapon groups 90 are deployed in the use field 60, it is desirable that the enemy weapon group 80 near to each of the groups (for example, nearest to a route on which the friendly weapons can move) is set as a belligerent power. Note that the friendly weapon group 90 (e.g. the fleet) contains at least one friendly weapon 70 (e.g. a ship) and the enemy weapon group 80 (e.g. the fleet) contains at least one enemy weapon 20 (e.g. a ship).

Figure 14:
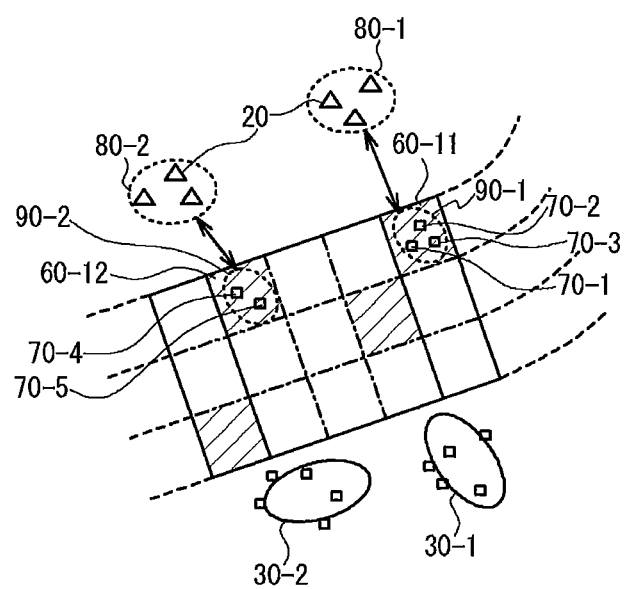
FIG. 14 is a diagram showing an example of deployment positions of the movable weapons obtained by the tactics support apparatus of the present invention.

Referring to FIG. 13 and FIG. 14, a specific method of a weapon deployment at the step S106 will be described. The two use fields 60-11 and 60-12 are set in the defense area 40-1. The friendly weapons 70 deployed in the use field 60-11 engage with the enemy weapon group 80-1, and the friendly weapons 70 deployed in the use field 60-12 engages with the enemy weapon group 80-2. Therefore, the tactics support apparatus 10 determines the kind of the friendly weapons 70 and the number of friendly weapons 70 deployed in the use field 60 according to the power of the enemy weapon group 80 as an engagement part. For example, the enemy military power corresponding to the use field 60-11 is a total power (e.g. strength) of "300" of the enemy weapons 20 which belong to the enemy weapon group 80-1. Also, the enemy military power corresponding to the use field 60-21 is a total power (e.g. strength) of "200" of the enemy weapons 20 which belong to the enemy weapon group 80-2.

The weapon deploying section 103 determines the kind of the friendly weapons 70 and the number of the friendly weapons 70 to be deployed in the use fields 60-11 and 60-12 from the ratio of the enemy military power. At this time, it is desirable that the friendly weapons 70 deployed in the use field 60 are determined based on a predetermined algorithm in consideration of a distance from the current position to the use field 60, the distance of the friendly weapon 70, the flight range of the friendly weapon 70 and the firing range of the friendly weapon 70 (e.g., a maximum range). The distance from the current position to the use field 60 is desirably determined in consideration of the geographical condition and the weather condition. For example, the friendly weapons for which a distance when avoiding a landform impossible to move is the shortest are allocated to the use field 60. Here, the friendly weapon group 90-1 (a total power (e.g., strength) of "350" by the friendly weapons 70-1 to 70-3 is deployed in the use field 60-1, and the friendly weapon group 90-2 (the total power of "200") of the friendly weapons 70-4 and 70-5 is deployed in the use field 60-21.

In this way, the condition is set such that the friendly weapon group 90-1 of the friendly weapons 70-1 to 70-3 engages with the enemy weapon group 80-1 in the use field 60-1, and the friendly weapon group 90-2 of the friendly weapons 70-4 and 70-5 engages with the enemy weapon group 80-2 in the use field 60-21. That is, the enemy weapon group 80 as the attack target of the friendly weapons 70 is set through the processing of the step S106 in addition to the deployment field of the friendly weapons 70. Note that in the above, an example where a field to be deployed is allocated for every friendly weapon 70 has been shown. However, the present invention is not limited to this example, and the defense area 40 or the use field 60 may be allocated in units of predetermined weapon groups. Also, the number of friendly weapon groups 90 which are allocated to the use field 60 is not restricted to one and may be more than one. Moreover, the number of enemy weapon groups 80 which engage with the friendly weapon group 90 is not restricted to one and may be plural. Also, a plurality of friendly weapon groups 90 may engage with one or more enemy weapon groups 80.

Next, the ammunition deploying section 104 deploys the ammunition for the friendly weapons 70 for every combination of the friendly weapon group 90 and the enemy weapon group 80 which are set as the engagement parts (Step S107).

In detail, the ammunition deploying section 104 selects the enemy weapon group 80, and the ammunition (e.g. guided arms) of the friendly weapons 70 which belongs to the friendly weapon group 90 for which the selected enemy weapon group 80 is set as the attack target (the engagement part). In case where the friendly weapon group 90 and/or the enemy weapon group 80, which are selected at this time, are plural, it is desirable that all of them are selected as the allocation object of the ammunition.

Next, the ammunition deploying section 104 sets the ammunition deployment (objective allocation of the guided weapons and the arms) according to an evaluation index which is set based on the threat of the selected enemy weapons 20 (for example, the ability of the loaded arms (the number of arms, firing ranges, and flight speeds)) and protection power (for example, anti-aircraft firearm performance), and the ammunition scores which are set based on the performance (the number of bullets and flight speed) of the loaded arms (the guided arms and the artilleries) of the friendly weapons 70. For example, an enemy weapon 20 whose threat (the offensive power) is large, and whose protection power is small, is allocated as the target of the ammunition with a high priority level.

Figure 15:
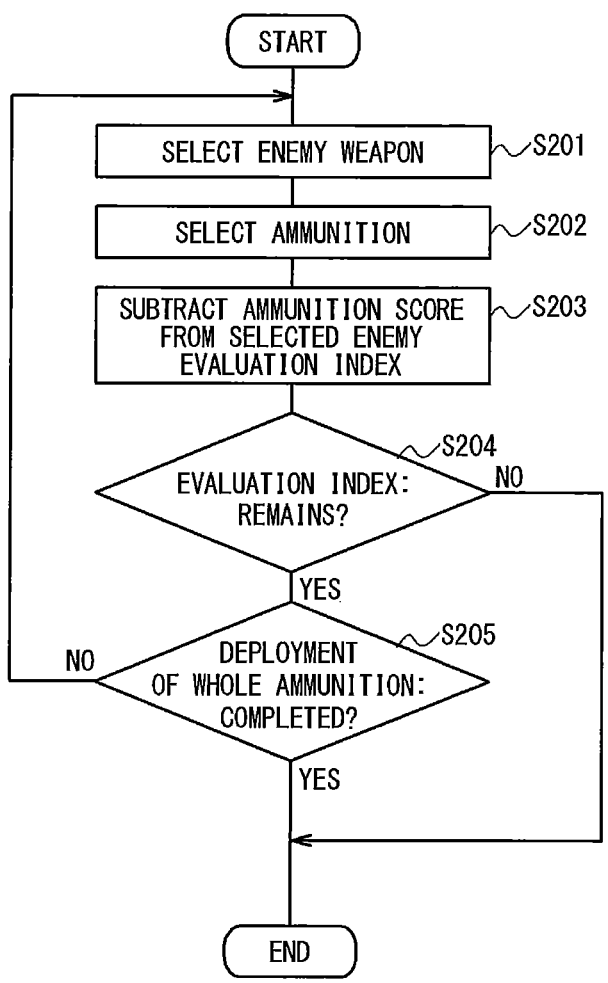
FIG. 15 is a flow chart showing an example of a method of deploying ammunition according to the present invention.
Figures 16, 17:
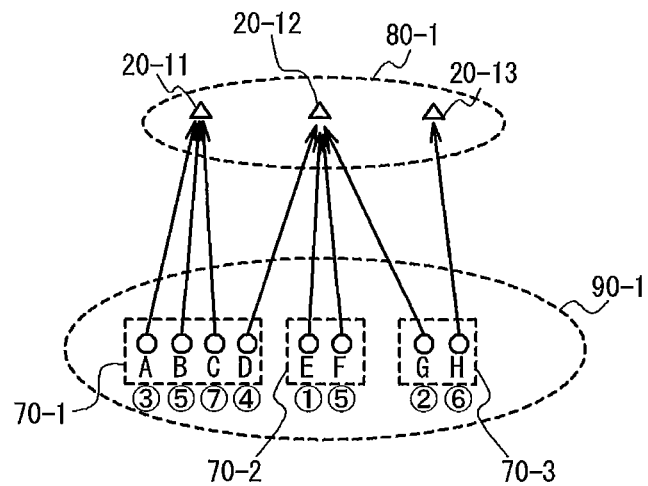
FIG. 16 is a conceptual diagram showing an example of a method of deploying ammunition according to the present invention.
FIG. 17 is a diagram showing an example of a method of deploying ammunition according to the present invention.

A specific method of the ammunition deployment at the step S107 will be described with reference to FIG. 15 to FIG. 17. FIG. 15 is a flowchart showing an example of the method of deploying the ammunition according to the present invention. FIG. 16 and FIG. 17 are diagrams showing the processing of allocating the targets of ammunition parts A to H in the friendly weapon group 90-1 deployed in the use field 60-1 to any of the enemy weapons 20-12 to 20-13 in the enemy weapon group 80-1. In this case, an example in which the ammunition parts are allocated to the enemy weapons 20 with the high evaluation index with priority will be described. Also, the ammunition parts A, B, C, and D are supposed to be loaded in the friendly weapon 70-1, the ammunition parts E and F are supposed to be loaded in the friendly weapon 70-2, and the ammunition parts G and H are supposed to be loaded in the friendly weapon 70-3.

The ammunition deploying section 104 selects the enemy weapons 20 as the ammunition allocation target (Step S201). In detail, it is desirable that priority levels allocated to the enemy weapons 20 are given, and that the ammunition deploying section 104 selects the enemy weapons 20 as the ammunition allocation target in these priority levels. Here, as an example, the priority levels are determined based on a value of the enemy evaluation index, and the enemy weapons 20 with the highest enemy evaluation index is selected as the ammunition allocation object. Referring to FIG. 17, initial enemy evaluation indexes of the enemy weapons 20-11, 20-12, and 20-13 are "400", "600", and "200". In this case, the enemy weapons 20-12 with the highest enemy evaluation index (evaluation index of "600") are selected as the allocation object of the ammunition.

Next, the ammunition deploying section 104 allocates the ammunition for the selected enemy weapon 20 (Step S202). In detail, it is desirable that the priority levels for the allocation are given to the ammunition parts and that the ammunition deploying section 104 selects a part of the ammunition which is the ammunition allocation object based on the priority levels. Here, as an example, the priority level is determined based on a value of the ammunition score and the enemy weapon 20 is allocated as a target in the greater order of the absolute values of ammunition scores. Referring to FIG. 16 and FIG. 17, the priority levels of 1, 2, 3, 4, 5, 6, 7, and 8 are respectively given to the ammunition part names of E (−150), G (−120), A (−100), D (−100), B (−80), F (−80), C (−50), H (−50) (here, ammunition score is shown in the brackets). At this time, it is desirable that when the ammunition parts have a same value of the ammunition score, the priority levels are determined based on a distance to the enemy weapon 20 which has been selected as the allocation object and/or targeting accuracy. Also, it is desirable that a distance between the ammunition and the enemy weapons is calculated in consideration of a flight route which does not pass over the use field 60 and the land and islands 30. At the step S202, the part "E" of the ammunition having the highest priority level is selected as the allocation object.

The ammunition deploying section 104 allocates the ammunition part "E" selected at the step S202 to the enemy weapon 20-12 selected at the step S201. That is, the target of the ammunition part "E" loaded in the friendly weapon 70-1 is set to the enemy weapon 20-12.

When the deployment of the ammunition completes, the ammunition deploying section 104 subtracts the ammunition score of the ammunition part from the enemy evaluation index of the enemy weapon 20 allocated as the target (Step S203). For example, the absolute value of the ammunition score "−150" of ammunition part "E" is subtracted from the enemy evaluation index "600" of the enemy weapon 20-12.

Thus, the evaluation index of each of the enemy weapons 20-11, 20-12, and 20-13 becomes "400", "450", and "200".

When there is the enemy weapon 20 having a remaining evaluation index in the enemy weapon group 80, and there is the ammunition to which the enemy weapon 20 as the target is not allocated, the processing advances from the step S201 to the step S203 (Step S204: Yes, step S205: No). On the other hand, when no evaluation indexes of all the enemy weapons 20 in the enemy weapon group 80 are present (Step S204: No), or when the target is allocated to all the ammunition parts in the friendly weapon group 90 (Step S205: Yes), the ammunition deployment processing to a combination of the selected friendly weapon group 90 and the enemy weapon group 80 ends.

After the ammunition part "E" is allocated to the enemy weapon 20-12, the processing shifts to the step S201 because there is the enemy evaluation index. In this case, the enemy weapon 20-12 with the greatest enemy evaluation index after the subtraction of the ammunition score is selected. Next, a part "G" of the ammunition with a higher priority level is allocated to the enemy weapon 20-12 and the absolute value of the ammunition score "−120" of the ammunition part "G" is subtracted from the enemy evaluation index "450" of the enemy weapon 20-12 (Steps S202 and S203). Thus, the evaluation index of each of the enemy weapons 20-11, 20-12, and 20-13 becomes "400", "330", and "200".

In the same way, after the ammunition part "G" is allocated to the enemy weapon 20-12, the processing shifts to the step S201 because the enemy evaluation index exists. Here, the enemy weapon 20-11 with the greatest enemy evaluation index after subtraction of the ammunition score is selected. Next, a part "A" of ammunition with the highest priority level is allocated for the enemy weapon 20-11 and an absolute value of the ammunition score "−100" of the ammunition part "A" is subtracted from the enemy evaluation index "400 of the enemy weapon 20-11 (Steps S202 and S203). Thus, the evaluation indexes of the enemy weapons 20-11, 20-12, and 20-13 become "300", "330", and "200".

Hereinafter, in the same way, the targets of the ammunition parts "D", "B", "F", "C", and "H" is allocated for the enemy weapons 20-12, 20-11, 20-12, 20-11, and 20-13, respectively. When the allocation of all the ammunition parts completes, the ammunition deployment processing for the combination of the friendly weapon group 90-1 and the enemy weapon group 80-1 ends, even if the enemy evaluation index remains. That is, in the present invention, because the purpose is not destroy but attrition of the enemy military power, it is not necessary to eliminate all the enemy evaluation indexes. Note that the enemy evaluation index may be the same parameter al as the above-mentioned military power, but be a different parameter.

When another combination of another friendly weapon group 90 and another enemy weapon group 80 exists in the defense area 40-1, the processing from the steps S201 to S205 is executed in the same way.

Referring to FIG. 7, when the ammunition deploying processing at the step S107 ends, but the ammunition deployment has not completed for all the defense areas 40, the processing shifts to a step S105. The tactics support apparatus 10 carries out the allocation of the enemy weapon group 80 as the target of the friendly weapons 70 and the ammunition deployment in order from the defense area 40 nearest to the enemy of the defense areas 40 where the ammunition deployment does not completed (Steps S105 to S108). For example, when the ammunition deployment ends for the defense area 40-1, the tactics support apparatus 10 carries out the deployment of the friendly weapon and the deployment of the ammunition for the defense area 40-2 which is the next front line. In the same way, when the ammunition deployment ends for the defense area 40-2, the deployment of the friendly weapons and the deployment of the ammunition for the defense area 40-3 which is the next front line.

Through the above processing, the tactics support apparatus 10 of the present invention determines the deployment of the friendly weapons 70 and the deployment of each of parts of the ammunition. In case of deployment of the ammunition, the direction of the ammunition and the ammunition route (for example, a flight route of the guided missile) is determined at the same time. The deployment result of the friendly weapons 70 is visibly outputted on the output unit 14 with the deployment of the enemy weapons 20 and the peripheral landform. Thus, the operator can confirm the deployment result of the friendly weapons 70 and can use it for the troops operation.

According to the tactics support apparatus 10 of the present invention, it is possible to carry out the deployment of the friendly weapons 70 and the deployment of the ammunition simply in a short time, by determining a cooperation policy (e.g., the use field 60) by the user. Thus, the operation procedure of the friendly weapons 70 can be determined in a short time after discovering the enemy weapons 20. Also, a beginner can carry out the operation of the friendly weapons 70 easily, regardless of the proficiency of an operation person. Also, in the present invention, a field between the enemy weapons 20 and the land and island 30 as the target by the enemy is restricted to a predetermined range, and divided into subfields (defense areas 40) and the military power is allocated to the respective defense areas 40 based on the Lanchester model. Thus, it does not become necessary to consider the deployment positions of the friendly weapons 70 in the vast field, and a calculation quantity for the weapon deployment can be greatly reduced. Also, because the detailed deployment of the military power and the ammunition deployment are calculated after setting the military power allocation roughly set based on the Lanchester model, an adaptive weapon operation procedure having workability can be made.

According to the tactics support apparatus 10 of the present invention, the deployment positions of the friendly weapons 70 can be determined in a short time in a level which approximates an optimal solution. Therefore, immediate measures become possible while the enemy is approaching. Also, the cooperation of the military powers can be automatically made in consideration of surface weapons (cannons, tanks, infantrymen), harbors, runways (launchable fields), and movable fields in addition to marine weapons (naval vessels, submarines). Especially, the present invention is effective because ships and aircrafts can be deployed in a wide field regardless of the landform so that the deployment positions can be determined in consideration of strength of fire power and firing range. Moreover, in case of detail calculation, the ammunition deployment can be determined according to a fleet scale, an enemy threat, or a defense potential of the enemy and a missile flight route can be determined to avoid friendly deployment positions depending on the landform. In the present invention, the friendly weapons can be deployed in use fields set in consideration of a geographical condition, a flight route, or an enemy approaching route, and then the ammunition deployment is carried out. Therefore, an operation procedure with a high workability can be made in consideration of a shooting direction and a missile cruising path.

Such as, the embodiments of the present invention have been described in detail. However, a specific configuration is not limited to the above, embodiment and is contained in the present invention even if there is a change or modification within the range which does not deviate from the spirit of the present invention.

The embodiments may be combined optionally in a range that there is no technical contradiction.

In the above-mentioned example, the ammunition deployment is carried out by using the evaluation index and the ammunition scores. However, the present invention is not restricted to the above example. The evaluation index is shown by a function of the deployment of the ammunition, and the ammunition deployment may be carried out, while decreasing the evaluation index according to an amount of the ammunition deployment. For example, the evaluation index f(i) is expressed by the following equation (4), the ammunition deployment is carried out according to FIG. 18. In this case, i is a number (e.g. a ship number) which identifies a weapon and is given to the weapon number maximum value in order from "1". A function V(i) shows the quantified power of the weapons specified by number i. p(i) shows a defense success probability to the ammunition which is launched to the weapon specified by the number i (e.g. one missile). A function q(i) shows 1-p(i). A function x(i) shows the number of ammunitions deployed to the weapon which is specified at number i.

$$f(i)=v(i) \times p(i) \times (q(i)) \times (i))^{x(i)} \tag{4}$$

Figure 18:
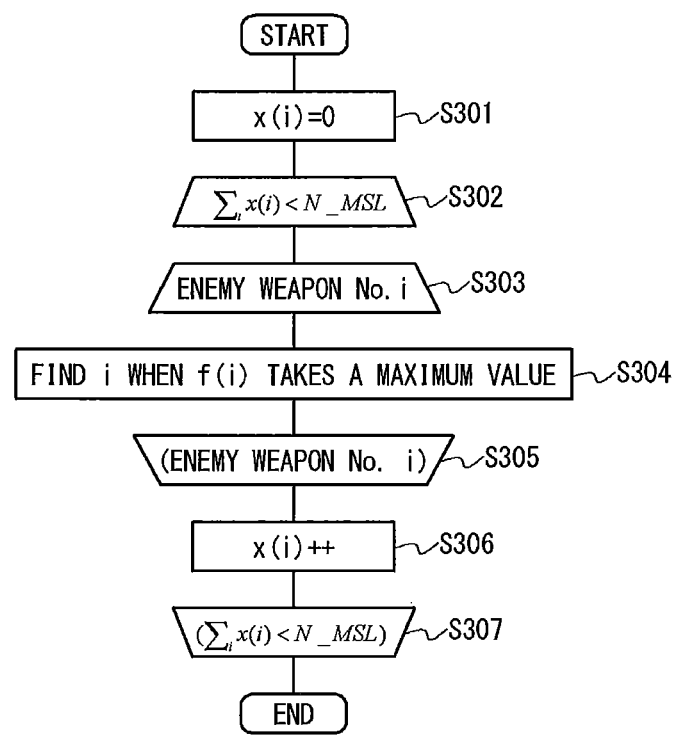
FIG. 18 is a flow chart showing another example of the way of distributing ammunition according to the present invention.

FIG. 18 is a flow chart showing another example of the method of deploying ammunition according to the present invention. Referring to FIG. 18, the ammunition deploying section 104 first initializes a distribution number x(i) to all the enemy weapons 20, then starts ammunition distribution processing (Step S301). Until the number "N_MSL" of all the ammunitions loaded in all the friendly weapons 70 and allocated by the weapon distribution processing at the step S106 is deployed, the ammunition deployment processing is carried out from steps S303 to S306. In detail, the ammunition deploying section 104 calculates f(i) shown in the equation (4) and extracts the number "i" when the evaluation index f(i) becomes the largest (Steps S303 to S305). Next, the ammunition deploying section 104 deploys one piece of the ammunition to counter the enemy weapon 20 which is specified by the extracted number "i" (Step S306). A priority level may be previously determined or determined based on a distance and direction to the deployed enemy weapon 20. By the ammunition distribution, a value of the evaluation index f(i) of the enemy weapons 20 with the number "i" decreases. In the same way, the ammunition deployment processing of the steps S303 to S306 is repeated for the number (N_MSL) of pieces of the ammunition. In this way, the ammunition deployment may be carried out by the evaluation index using the quantified military power without depending on the ammunition score.

What is claimed is:

1. A tactics support system, comprising:
   an external storage device which stores a tactics support program, policy data, friendly military power data, enemy military power data, and geographic data;
   a CPU connected with the external storage device to execute the tactics support program to implement:
      a military power calculating section which quantifies a friendly military power by referring to the friendly military data to normalize a performance of each of friendly weapons equipped in each of friendly movable weapons with a predetermined value corresponding to a type of the friendly weapon, and quantifies an enemy military power by referring to the enemy military power data to normalize a performance of each of enemy weapons forecasted to be equipped in each of enemy movable weapons with the predetermined value,
      a defense area determining section which determines defense areas, which are set between an enemy and a target of the enemy, based on the policy data, a quantified value of the enemy military power and a quantified value of the friendly military power,
      a military power allocating section which calculates a part of the quantified value of the friendly military power to be allocated to each of the defense areas, based on the quantified value of the enemy military power, and
      a weapon deploying section which calculates the friendly movable weapons to be deployed to each of the defense areas, and determines at least a use field in the defense areas for the friendly movable weapons to be deployed based on current positions of the friendly movable weapons and current positions of the enemy movable weapons; and
   a display device connected with the CPU to visibly output a deployment of the friendly movable weapons.

2. The tactics support system according to claim 1, wherein the CPU executes the tactics support program to further implement an ammunition distributing section which calculates a distribution of ammunition for the friendly movable weapons to the use field for the friendly movable weapons, based on a combination of the friendly movable weapons and at least one of the enemy movable weapons.

3. The tactics support system according to claim 1, wherein the CPU executes the tactics support program to further implement a retreat estimating section which determines whether the friendly military power, which has been deployed, should retreat from each of the defense areas by using a Lanchester model, based on a retreat condition set to each of the defense areas.

4. The tactics support system according to claim 3, wherein the use field is set to each of the defense areas, and
   wherein the retreat condition is set based on a size of the use field.

5. A tactics support method executed by a computer, the tactics support method comprising:
   quantifying a friendly military power by referring to friendly military data to normalize a performance of each of friendly weapons equipped in each of friendly movable weapons with a predetermined value corresponding to a type of the friendly weapon, and quantifying an enemy military power by referring to enemy military power data to normalize a performance of each of enemy weapons forecasted to be equipped in each of enemy movable weapons with the predetermined value;
   determining defense areas, which are set between an enemy and a target of the enemy, based on policy data, a quantified value of the enemy military power and a quantified value of the friendly military power;
   calculating a part of the quantified value of the friendly military power to be allocated to each of the defense areas, based on the quantified value of the enemy military power;
   calculating the friendly movable weapons to be deployed to each of the defense areas, and determining at least a use field in the defense areas for the friendly movable weapons to be deployed based on current positions of the friendly movable weapons and current positions of the enemy movable weapons; and visibly outputting a deployment of the friendly movable weapons.

6. The tactics support method according to claim 5, further comprising:
   determining a distribution of ammunition for the friendly movable weapons to the use field for the friendly movable weapons to be deployed, based on a combination of the friendly movable weapons and at least one of the enemy movable weapons.

7. The tactics support method according to claim 5, wherein the quantifying a friendly military power comprises:
   calculating whether the friendly military power, which has been deployed, should retreat from each of the defense areas by using a Lanchester model, based on a retreat condition set to each of the defense areas.

8. The tactics support method according to claim 7, wherein the use field is set to each of the defense areas, and
   wherein the retreat condition is set based on a size of the use field.

9. A non-transitory computer-readable storage medium, which stores a computer program, when executed by a computer, to realize the functions of:
   quantifying a friendly military power by referring to friendly military data to normalize a performance of each of friendly weapons equipped in each of friendly movable weapons with a predetermined value corresponding to a type of the friendly weapon, and quantifying an enemy military power by referring to enemy military power data to normalize a performance of each of enemy weapons forecasted to be equipped in each of enemy movable weapons with the predetermined value;
   determining defense areas, which are set between an enemy and a target of the enemy, based on policy data, a quantified value of the enemy military power and a quantified value of the friendly military power;
   calculating a part of the quantified value of the friendly military power to be allocated to each of the defense areas, based on the quantified value of the enemy military power;
   calculating the friendly movable weapons to be deployed to each of the defense areas, and determining at least a use field in the defense areas for the friendly movable weapons to be deployed based on current positions of the friendly movable weapons and current positions of the enemy movable weapons; and
   allowing an output unit to visibly output a deployment of the friendly movable weapons.

* * * * *